O. P. Briggs & L. W. Briggs.
Bolt Cutting Machine.

Plate 1

115009    PATENTED MAY 16 1871

Witnesses
N. H. Sherburne
N. C. Gridley

Inventors
Orlando P. Briggs
Lewis W. Briggs
By Harwell & Co.
Attys

O. P. Briggs & L. W. Briggs.
Bolt Cutting Machine.

Plate 2.

Witnesses
C. H. Sherburne
N. C. Gridley

Inventors
Orlando P. Briggs
Lewis W. Briggs
By Pararee &co
Atty

UNITED STATES PATENT OFFICE.

ORLANDO P. BRIGGS AND LEWIS W. BRIGGS, OF CHICAGO, ILLINOIS; SAID O. P. BRIGGS ASSIGNOR TO LEWIS W. BRIGGS.

IMPROVEMENT IN MACHINES FOR CUTTING SCREW-THREADS ON BOLTS.

Specification forming part of Letters Patent No. 115,009, dated May 16, 1871.

*To all whom it may concern:*

Be it known that we, ORLANDO P. BRIGGS and LEWIS W. BRIGGS, of Chicago, in the county of Cook and State of Illinois, have invented certain new and useful Improvements in Bolt-Cutting Machines; and we do hereby declare the following to be a full, clear, and exact description thereof, which will enable others skilled in the art to which our invention appertains to make and use the same, reference being had to the accompanying drawings, forming part of this specification, in which—

Figure 1:
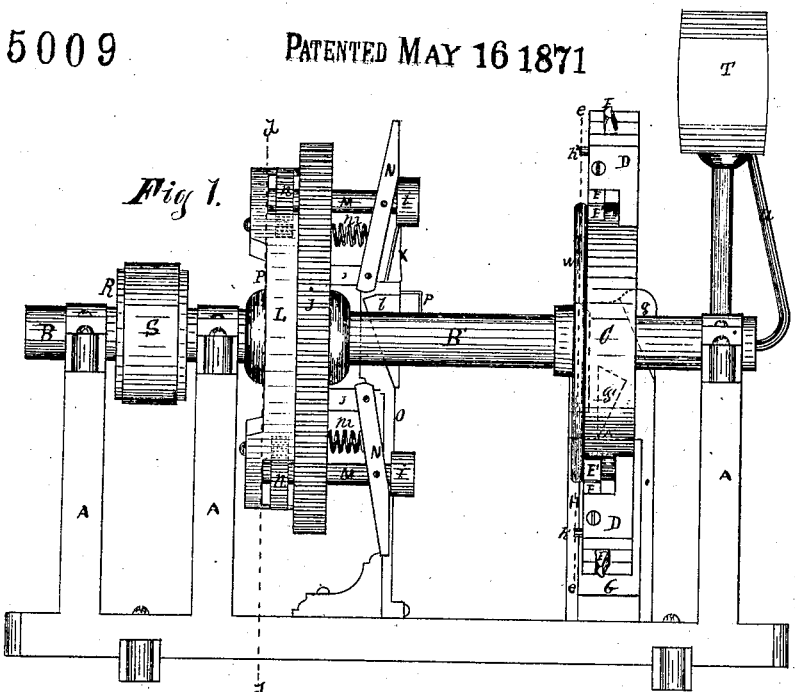
Figure 2:
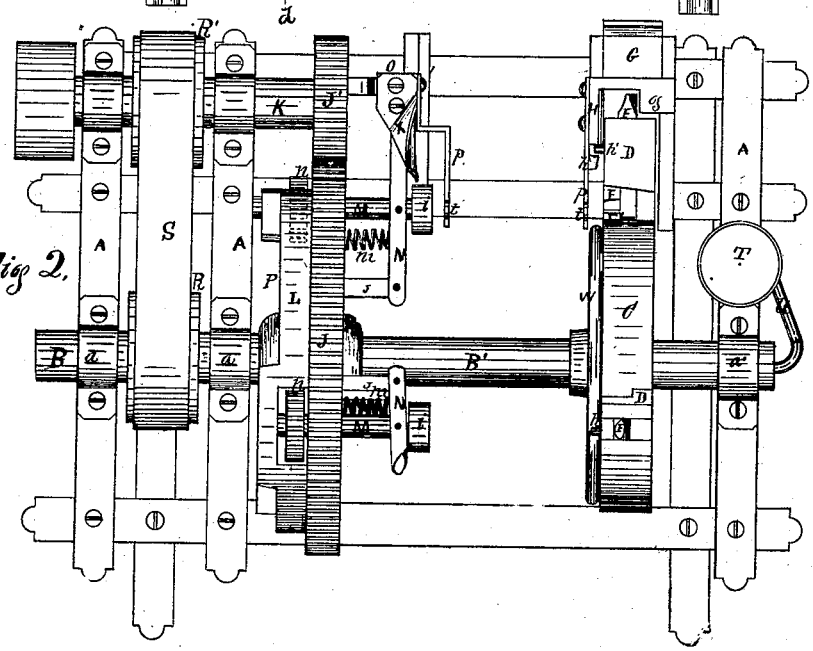
Figure 3:
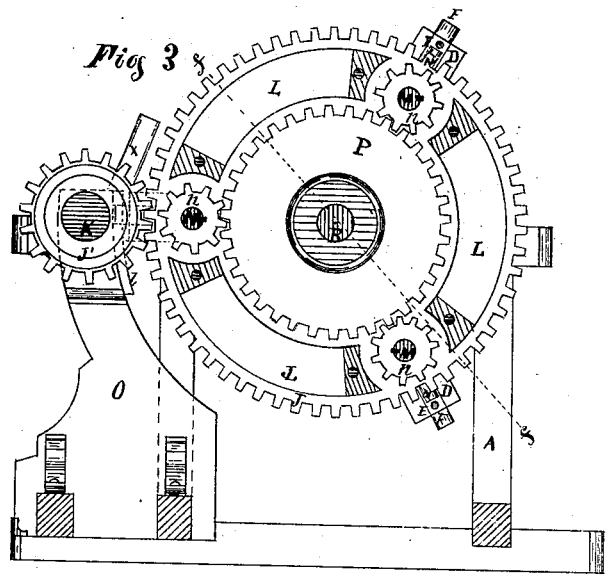
Figure 4:
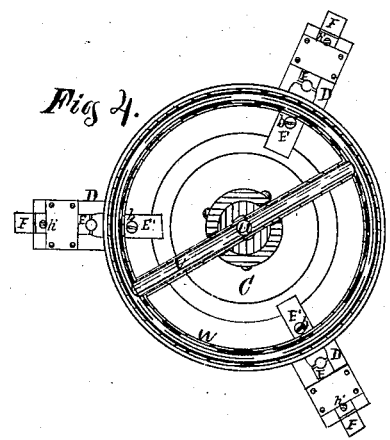
Figure 5:
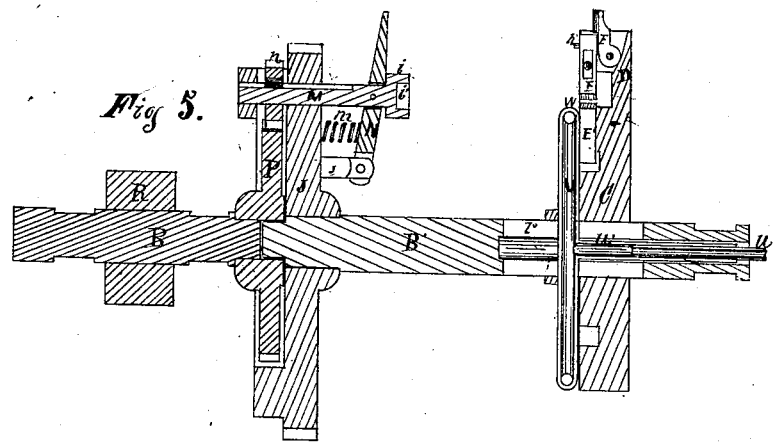

Figure 1, Plate 1, is a side elevation of a bolt-cutting machine embodying our invention. Fig. 2, Plate 1, is a top view of the same. Fig. 3, Plate 2, is a vertical transverse section, showing those parts of the machine which are at the right hand of the line *d d*, drawn vertically through Fig. 1. Fig. 4, Plate 2, is a detached cross-section of the shaft carrying the dies, showing those parts which are at the right hand of the line *e e*, drawn vertically through Fig. 1; and Fig. 5, Plate 2, is a detached longitudinal section of said shaft, showing the respective parts connected therewith which are at the right hand of the line *f f*, drawn obliquely across Fig. 3.

Similar letters of reference indicate corresponding parts in the several figures of the drawings.

Our invention relates to a machine for cutting threads on bolts automatically; and it consists, among other parts, of a series of revolving screw-threading dies, a revolving series of rotating bolt-holding devices, gear-wheels and mechanism to rotate said wheels in opposite directions, and in a device for lubricating the bolts while in process of being cut.

In the accompanying drawings, A is the frame-work, which is substantially made of wood or metal, or both combined, and which may be arranged as shown, or may be in any suitable form that will receive the moving parts of the machine.

Mounted upon the upper side of the frame is the main shaft, which is made in two separate sections, B and B'. The bearings of section B are secured within boxes *a a*, affixed to the cross-girts of the frame; and the bearing of section B' is also secured at one end in a like manner within a box, *a'*, affixed to a similar cross-girt of the frame, and its bearing at the opposite end is secured to and within the end of section B, the whole of which is so arranged as to admit of an opposite rotating movement of the separate sections.

Affixed upon section B', near its outer end, is a disk, C, which is so arranged as to admit of being moved thereon longitudinally, and can be firmly secured at any adjusted point by means of set-screws passing through its hub to and against the shaft. Secured to the periphery of said disk is a system of arms, D, which are provided with a groove or recess extending inward toward the axis of the disk, within which grooves are arranged the respective die-plates E and E'. The die-plates E' are so arranged as to admit of being moved to or from the center of the disk, and rigidly secured at any desired point by means of a set-screw, *b*, passing through the same, the object being to adjust the dies to the different-sized bolts. The said die-plates E are also arranged or fitted within the grooves in a manner which admits of a free and easy sliding movement, and are secured firmly against the die-plate E', when closed, by means of a hook, F, pivoted to and within the arm in such a manner as to engage the outer extremity of the said die-plate.

Firmly attached to the base of the frame is a vertical upright, G, which extends upward to or slightly above the center or axis of the disk. The upper and inner portion of said upright is concaved approximating the circle described by the rotation of the arms. To the said concaved surface are firmly affixed inclined lugs *g g*, as shown by dotted lines, Fig. 1, which are so arranged as to alternately engage the outer extremity of the respective hooks as the disk is rotated, by which means the said hooks are engaged with or disengaged from the respective dies. The said upright is provided, upon its side toward the center of the machine, with a flange, H, arranged at a right angle to its concaved surface, and upon which is also secured an inclined lug, *h*, so arranged as to form a curved or inclined groove, into and through which pass pivots *h'*, affixed to the die-plates E, as said disk is rotated, the arrangement of the said groove being such as to move the die-plates E outward as the hook F is disengaged therefrom, whereby the bolt is discharged from the dies; also, to force the said dies inward simultaneously with the engaging of the hook therewith. The said upright is so affixed to the base of the frame as to admit of being moved to any desired point laterally with the frame or in the direction of its length, the object being to change its position to agree with the dies when said dies are adjusted to cut different sizes and lengths of bolts.

Firmly affixed to and upon section B' of the main shaft, at its end opposite to the disk, is a gear-wheel, J, which engages a corresponding pinion, J', on the driving-shaft K. Attached to said wheel J, near its periphery, is an annular rim, L, which rim may be formed as a part of the said wheel, or may be made separately and properly bolted thereon. Within said wheel J and rim L of the same are loosely secured primary shafts M, which are respectively arranged horizontally in the same plane with the separate dies. The ends of said primary shafts toward the dies are screw-threaded, upon which is secured a disk, $i$, which is provided internally with a socket, $i'$, to receive the bolt-head. Firmly affixed to said wheel, near its axis, are arms $j$, to which are pivoted levers N, extending outward slightly beyond the periphery of the wheel, and through which the said primary shafts M pass. Secured to the said levers, between shaft M and arm $j$, are spiral springs $m$, so arranged as to be in contact with and against the face of the wheel carrying the levers, by which means the said levers and primary shafts are forced outward to the proper point to introduce the bolt-head into the disk of the said primary shafts, which is so arranged as to secure the said levers in proper adjustment.

Firmly secured to the side of the base of the frame, in a line laterally with the levers N, is a vertical upright, O, which extends upward to or slightly above the centre or axis of the wheel. The inner side of said upright is concaved approximating the circle described by the outer extremities of the levers as the same are rotated by the wheel. Upon the said concaved surface is firmly secured an inclined or wedge-shaped lug, $l$, as shown in Fig. 1, which is so arranged as to engage its inclined surface with the outer extremities of the levers as the wheel is rotated, by which means the respective primary shafts are moved longitudinally from the disk, the arrangement of the shafts and connection with the levers being such as to admit of the movement. Secured upon each of said primary shafts, between their bearings, is a gear-pinion, $n$, which engages a corresponding gear-wheel, P, on the end of the section B of the main shaft. Thus, as wheel J is rotated by the action of the driving-shaft, an independent rotating movement is imparted to the primary shafts. Said primary shafts are each provided with a longitudinal groove or key-seat, which receives a feather-key secured within the pinion, by which means the shaft is allowed a free and easy longitudinal movement as the same is rotated by the action of the pinion.

Firmly affixed to the sides of the separate uprights G and O are horizontal arms $p\ p$, extending inward toward the center of the machine, upon the inner ends of which are formed curved recesses $t\ t$, which are arranged in a line with the circle described by the rotation of the dies and primary shafts, and into which recesses the bolts are placed preparatory to being fed into the machine.

Affixed on section B of the main shaft is a wheel, R, corresponding with a like wheel, R', on the driving-shaft K, and around which wheels pass a belt, S, by which means a requisite motion is imparted to wheel P.

Secured to the frame and above the same, near the dies, is a cask, T, to contain the necessary lubricating-oil. To this cask is attached a tube, U, communicating with a similar tube, U', secured within section B' of the main shaft, the same being made hollow to receive said tube. To the said tube U' is affixed a corresponding tube, V, which extends outward to the periphery of the disk through a slot or mortise, $r$, cut through section B'. To the outer extremities of said tubes V is attached an annular tube, W, secured to the face of the disk, around and near its periphery. Within this annular tube we provide a series of apertures, so arranged as to allow the oil from the cask to enter and pass through the respective tubes to and upon the dies, by which means the bolts are properly lubricated while in process of being cut.

We do not wish to confine ourselves to the use of a belt for imparting the requisite rotary motion to wheel P, as a suitable system of geared wheels may be employed which will produce the same result.

The operation of our machine is as follows: The operator places the bolt within the recesses of the arms $p\ p$, with the head toward wheel J, motion being imparted to said wheel by the rotation of pinion J' of driving-shaft K, which brings the outer end of lever N in contact with the inclined surface of lug $l$ of upright O, forcing disk $i$ of primary shaft M backward toward wheel J, which allows said disk $i$ to move to and in line horizontally with the bolt. Lever N then being passed, lug $l$ and spring $m$ force the primary shaft and disk back to its normal position, by which means the bolt-head is forced into socket $i'$. The outer end of said lever is then brought in contact with and against the side of arm N of upright O, forcing the opposite end of the bolt into the dies. An independent rotating movement is imparted to the bolt as the same is revolved, together with wheel J and disk C, by the rotating motion of pinion $n$ of the primary shaft, communicated thereto by the opposite rotating motion of wheel P on section B of the main shaft, by which means the thread is cut on the bolt, the distance the thread is cut on the bolt from its end being graduated by the number of revolutions of the primary shafts, said bolts being respectively discharged from the dies as the said die-plate E' is moved outward by pivot h' passing through the inclined groove of upright G, whereby a continuous motion of the machine is obtained.

Having thus described the nature and object of our invention, what we claim as new, and desire to secure by Letters Patent, is—

1. The combination of the jointed shafts B B', gear-wheels J and P, mechanism to rotate said wheels in opposite directions, pinion n, bolt-holding shafts M, and revolving series of screw-threading dies, substantially as described.

2. In combination with the gear-wheels, pinions, and bolt-holding shafts set forth in first claim, the spring-levers N, arm X, and lug l, substantially as described.

3. The combination, with a revolving series of rotating bolt-holding devices, of the revolving disk C, series of screw-threading dies E' E', hooks F, pins h, and lugs g g', substantially as described.

4. In combination with the subject-matter of the third claim, the arms p p, for supporting the bolt-blank, substantially as described.

5. In combination with disk C, the annular tube W, tubes V u u', and cask T, the whole arranged as described for lubricating the bolt, substantially as specified.

The foregoing specification signed by us this 28th day of February, 1871.

ORLANDO P. BRIGGS.
LEWIS W. BRIGGS.

Witnesses:
- N. C. GRIDLEY,
- N. H. SHERBURNE.